United States Patent [19]

Hauser et al.

[11] Patent Number: 4,863,352
[45] Date of Patent: Sep. 5, 1989

[54] BLADE CARRYING MEANS

[75] Inventors: Ambrose A. Hauser, Wyoming, Ohio; Thomas G. Wakeman, Greendale, Ind.; William J. Strock; David B. Morris, both of Cincinnati, Ohio

[73] Assignee: General Electric Company, Cincinnati, Ohio

[21] Appl. No.: 667,663

[22] Filed: Nov. 2, 1984

[51] Int. Cl.⁴ ............................................. B63H 1/20
[52] U.S. Cl. ................................................ 416/204 R
[58] Field of Search ................ 416/204 R, 205, 209, 416/147, 166, 193 A

[56] References Cited

U.S. PATENT DOCUMENTS

| | | | |
|---|---|---|---|
| 1,089,239 | 3/1914 | Mason | 416/205 |
| 2,541,098 | 2/1951 | Redding | 416/193 |
| 2,918,316 | 12/1959 | Runton et al. | 416/204 |
| 3,545,884 | 12/1970 | Schroeter et al. | 416/205 |
| 3,799,698 | 3/1974 | Haworth | 416/204 |
| 3,811,791 | 5/1974 | Cotton | 416/129 |
| 4,412,783 | 11/1983 | Barlass | 416/147 |

*Primary Examiner*—Donald E. Stout
*Attorney, Agent, or Firm*—Derek P. Lawrence; Nathan D. Herkamp

[57] ABSTRACT

Blade carrying means for variable pitch propulsor blades of a gas turbine engine are disclosed. The blade carrying means comprise dual, axially positioned rings and a plurality of generally cylindrical bearing journals supported between the rings. Each of the journals has a radially outer and inner edge and is adapted to support a single propulsor blade. The blade carrying means also comprise stiffening means, such as a bulkhead attached to the inner edge, for preventing distortion of the journal inner edge.

4 Claims, 2 Drawing Sheets

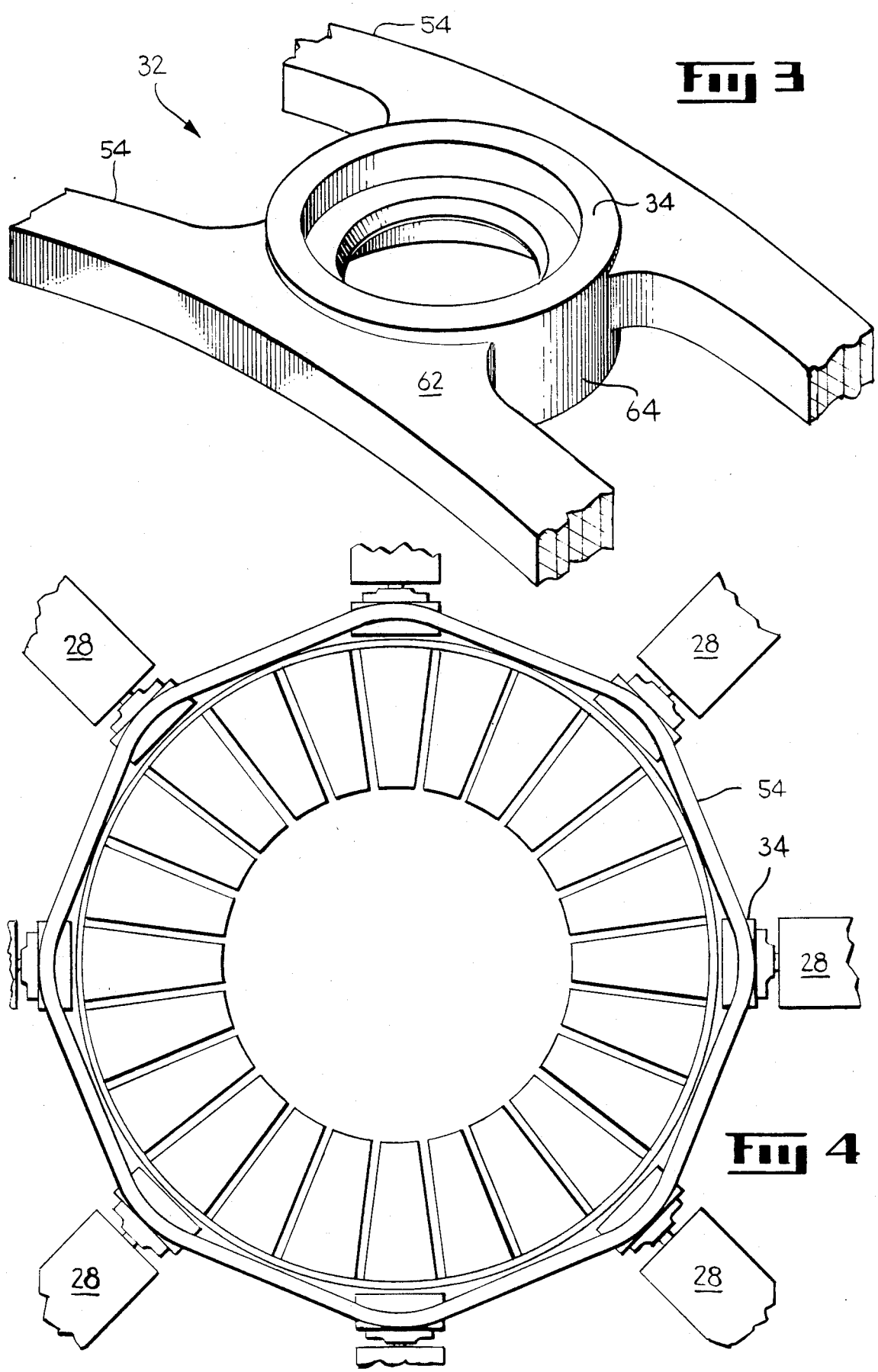

BLADE CARRYING MEANS

This invention relates generally to turbofan and turboprop engines and, more particularly, to means for supporting variable pitch propulsor blades therein.

BACKGROUND OF THE INVENTION

Gas turbine engines generally include a gas generator which comprises a compressor for compressing air flowing through the engine, a combustor in which fuel is mixed with the compressed air and ignited to form a high energy gas stream, and a turbine which includes a rotor for driving the compressor. Many engines further include a second turbine, known as a power turbine, located aft of the gas generator and which extracts energy from the gas flow to drive either a ducted fan or a propeller.

A recent improvement over the turbofan and turboprop engines described above is the unducted fan engine such as disclosed in U.S. patent application Ser. No. 437,923, now abandoned. In the unducted fan engine, the power turbine includes counterrotating rotors and turbine blades which drive counterrotating unducted fan blades radially located with respect to the power turbine. In order to achieve optimum performance, each of the unducted fan blades will have a variable pitch which requires a blade retention bearing to support each blade hub.

In conventional turboprop engines, the blade retention bearing is supported by a relatively deep cup-shaped structure. This is necessary in order to limit bearing deflections which are caused by the high centrifugal loads of the rotating blades. For example, hub ring depth to diameter ratios on the order of 2 to 1 or greater are known.

The radial location of the unducted fan blades with respect to the power turbine limits the bearing hub depth. The generic problem thus presented is how to support a plurality of variable pitch rotating blades with a relatively shallow hub support.

OBJECTS OF THE INVENTION

It is an object of the present invention to provide new and improved blade carrying means for variable pitch rotatable blades.

It is another object of the present invention to provide blade carrying means with a bearing journal having a hub depth to diameter ratio of less than 1.0.

It is a further object of the present invention to provide a light-weight blade carrying means for variable pitch rotatable propulsor blades which minimizes hub bearing deflections.

SUMMARY OF THE INVENTION

The present invention includes blade carrying means for a plurality of variable pitch propulsor blades, rotatable about an axis in a gas turbine engine. Blade carrying means comprise dual, coaxially positioned rings, a plurality of generally cylindrical bearing journals and stiffening means. The bearing journals are supported between the rings. Each of the journals has radially outer and inner edges and is adapted to support a respective one of the blades. The stiffening means prevent distortion of the journal inner edge.

BRIEF DESCRIPTION OF THE DRAWINGS

FIG. 3 is a perspective view of the blade carrying means according to the present invention.

FIG. 4 is a view taken along the line 4—4 in FIG. 1.

DETAILED DESCRIPTION OF THE DRAWINGS

Figure 1:
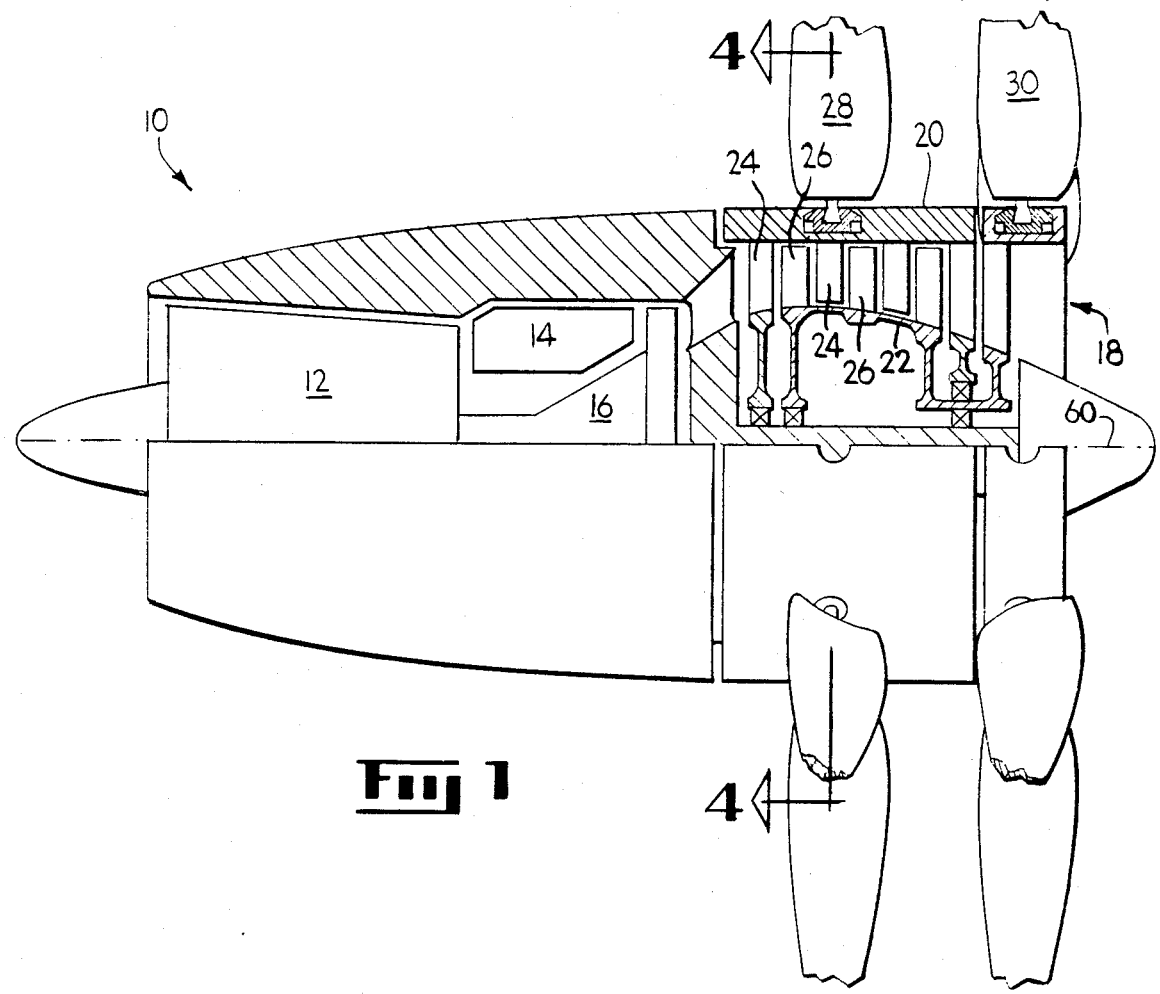
FIG. 1 is a view of a gas turbine engine embodying the present invention.

FIG. 1 illustrates a gas turbine engine 10 with compressor section 12, combustor 14, and turbine 16 in axial flow relationship. Located aft of turbine 16 is power turbine 18. In the particular engine configuration shown, power turbine 18 comprises counterrotating rotors 20 and 22 driven by counterrotating turbine blades 24 and 26, respectively. Unducted fan blades 28 and 30 are radially located with respect to power turbine 18 and rotate with rotors 20 and 22, respectively. Although the embodiment described above is for counterrotating unducted fan blades, it will be clear to those skilled in the art that the invention described hereinafter is not so limited but applies equally to single rotating blades as well.

Figure 2:
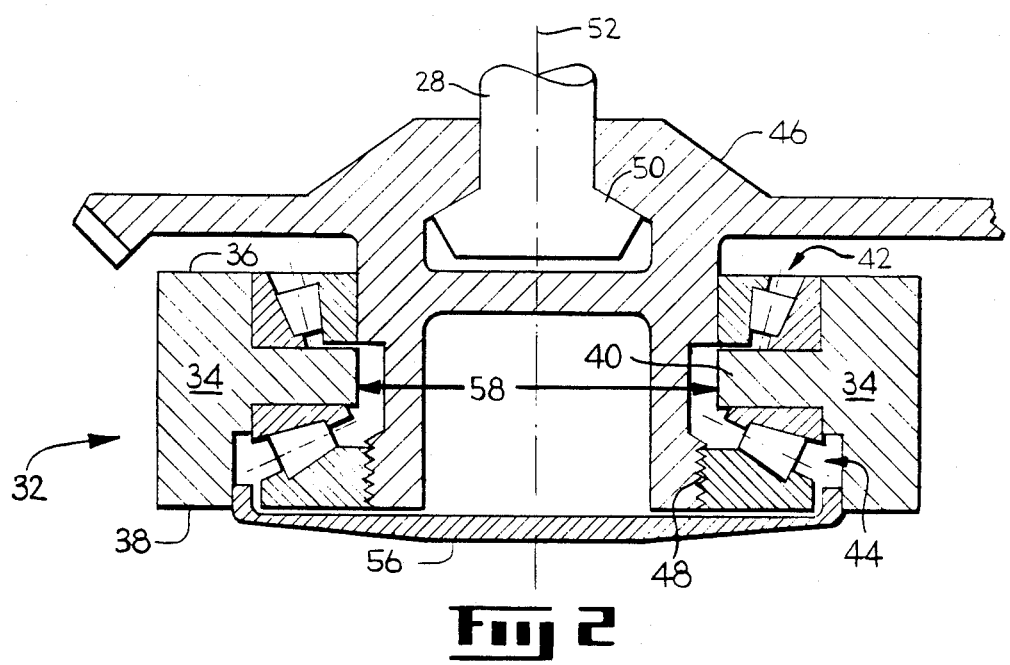
FIG. 2 is a cross-sectional side view in more detail of the blade carrying means as shown in FIG. 1.

FIG. 2 shows in greater detail some of the features of blade carrying means 32. These include a generally cylindrical bearing journal 34. Bearing journal 34 has a radially outer edge or surface 36 and a radially inner edge or surface 38. In the embodiment shown, bearing journal 34 includes an inwardly facing flange 40 for supporting radially outer bearing means 42 and radially inner bearing means 44. Blade carrying means 32 further includes stiffening means 56 for journal inner edge 38. For example, stiffening means 56 may include a solid plate or bulkhead rigidly connected to inner edge 38.

Blade hub 46 is positioned within bearing journal 34 and spaced therefrom by bearing means 42 and 44. Numerous means exist for retaining blade hub 46 within bearing journal 34. For example, in the embodiment shown, blade hub 46 is retained by thread 48. Blade 28 may be either integrally formed with blade hub 46 or attached thereto by appropriate means. For example, FIG. 2 shows blade 28 being retained by means of dovetail 50.

Although not shown in FIG. 2, blade 28 may have a variable pitch. In such case, blade 28 and blade hub 46 will be rotatable with respect to blade axis 52.

FIG. 3 shows a further view of blade carrying means 32 without bearing means 42 and 44 and blade 28 shown in FIG. 2. In addition to bearing journal 34, blade carrying means 32 comprise dual, axially positioned rings 54. As can be seen by comparing FIGS. 3 and 2, rings 54 support bearing journals 34 and blend into opposite sides of bearing journal 34.

FIG. 4 shows an aft view of blade carrying means 32 including bearing journal 34 and a ring 54. Ring 54 has a generally linear shape between adjacent blades 28. Thus, the entire ring 54 is generally polygonally shaped. It is within the scope of the present invention to include polygonal rings of nonregular shape as well. For example, if an additional load is located on ring 54 between adjacent blades 28, ring 54 may be configured to bulge out at that point while being connected to adjacent blades 28 by generally linear segments of ring 54. In this manner, the benefit of polygonal shaping may be maintained.

The configuration, thus described, discloses a relatively shallow bearing journal 34 for supporting a blade hub 46. For example, the ratio of the distance between outer journal edge 36 and inner journal edge 38 to the inner diameter 58 of journal 34 is less than 0.7.

In operation, propulsor blades 28 rotate about engine axis 60. Such rotation will result in significant centrifugal loads in blade hub 46. These loads must be transferred to rings 54 primarily through bearing means 44. As can be seen in FIG. 3, blend region 62 has significantly more structure than bearing journal 34 in the cross-over region 64 between adjacent rings 54. Thus, there will be a tendency for bearing journal 34 to deflect in cross-over region 64 while remaining relatively stiff in blend region 62.

This non-uniform stiffness of bearing journal 34 may result in deflections in bearing means 44 which result in either excessive or non-uniform wear. In order to reduce these deflections, stiffening means 56 for preventing distortion of inner journal edge 38 have been provided. In this manner, deflections of bearing journal 34 in cross-over region 64 may be reduced to acceptable levels.

Rings 54 are generally polygonally shaped, as described above with reference to FIG. 4. Polygonal rings are able to react to large centrifugal loadings of the fan blades by tensile forces through the cross-section of the ring. In addition, generally linear ring segments connecting adjacent blades eliminate the additional bending moments which would be created by a curved ring.

It will be clear to those skilled in the art that the present invention is not limited to counterrotating unducted fan blades. Rather, the invention applies equally to any variable pitch propulsor blades.

It will be understood that the dimensions and proportional and structural relationships shown in the drawings are by way of example only, and these illustrations are not to be taken as the actual dimensions or proportional structural relationships used in the blade carrying means of the present invention.

Numerous modifications, variations, and full and partial equivalents can now be undertaken without departing from the invention as limited only by the spirit and scope of the appended claims.

What is desired to be secured by Letters Patent of the United States is the following.

What is claimed is:

1. In a gas turbine engine with a plurality of variable pitch propulsor blades rotatable about an axis, blade carrying means comprising:

dual, axially positioned rings;

a plurality of generally cylindrical bearing journals supported between said rings, each of said journals having radially outer and inner edges, and being adapted to support a respective one of said blades; and stiffening means for preventing distortion of said journal inner edge.

2. Blade carrying means, as recited in claim 1, wherein said stiffening means includes a bulkhead attached to said inner edge.

3. Blade carrying means, as recited in claim 2, wherein the ratio of the distance between said outer and inner journal edges to the inner diameter of said journal is less than 0.7.

4. Blade carrying means, as recited in claim 1, wherein said rings are generally polygonally shaped.

* * * * *